(12) United States Patent
Pekala et al.

(10) Patent No.: US 9,997,756 B2
(45) Date of Patent: Jun. 12, 2018

(54) LEAD-ACID BATTERY SEPARATORS WITH ULTRA LOW RESISTIVITY AND SUSTAINED WETTABILITY

(71) Applicant: Amtek Research International LLC, Lebanon, OR (US)

(72) Inventors: Richard W. Pekala, Corvallis, OR (US); Chi Thuong-Le La, Happy Valley, OR (US); Cory S. Rogers, Eugene, OR (US); Jeffry M. Frenzel, Albany, OR (US); Robert Waterhouse, Lebanon, OR (US); David P. Walker, Wallsend (GB)

(73) Assignee: AMTEK RESEARCH INTERNATIONAL LLC, Lebanon, OR (US)

( * ) Notice: Subject to any disclaimer, the term of this patent is extended or adjusted under 35 U.S.C. 154(b) by 0 days. days.

(21) Appl. No.: 14/775,608

(22) PCT Filed: Mar. 13, 2014

(86) PCT No.: PCT/US2014/026780
§ 371 (c)(1),
(2) Date: Sep. 11, 2015

(87) PCT Pub. No.: WO2014/151991
PCT Pub. Date: Sep. 25, 2014

(65) Prior Publication Data
US 2016/0028060 A1    Jan. 28, 2016

Related U.S. Application Data

(60) Provisional application No. 61/792,631, filed on Mar. 15, 2013, provisional application No. 61/868,478, filed on Aug. 21, 2013.

(51) Int. Cl.
*H01M 2/16* (2006.01)
*H01M 2/14* (2006.01)
(Continued)

(52) U.S. Cl.
CPC ......... *H01M 2/166* (2013.01); *B29C 47/0021* (2013.01); *B29C 71/0009* (2013.01);
(Continued)

(58) Field of Classification Search
CPC .. H01M 2/145; H01M 2220/20; H01M 10/06; H01M 2/162; H01M 2/1646;
(Continued)

(56) References Cited

U.S. PATENT DOCUMENTS 2,926,142 A    2/1960  Eccles et al.
3,870,567 A    3/1975  Palmer et al.
(Continued)

FOREIGN PATENT DOCUMENTS

JP    2001206966 A    7/2001
JP    2004523088 A    7/2004
(Continued)

OTHER PUBLICATIONS

International Search Report and Written Opinion dated Jul. 28, 2014 in PCT/US2014/026780.

*Primary Examiner* — Jonathan G Jelsma
*Assistant Examiner* — Omar M Kekia
(74) *Attorney, Agent, or Firm* — Stoel Rives LLP

(57) ABSTRACT

A lead-acid battery separator with ultralow resistivity results from high porosity, controlled pore (10) size distribution, and an ionic surfactant (14) with a long alkyl side chain (18) that is anchored to the polymer matrix (12) of a silica-filled polyethylene separator. The surfactant cannot be easily removed or washed away and thereby imparts sustained wettability to the separator. Controlling the number of, and (Continued)

volume occupied by, the pores (i.e., porosity) and pore size distribution of the separator contributes to a reduction in electrical (ionic) resistivity.

20 Claims, 7 Drawing Sheets

(51) Int. Cl.
*B29C 47/00* (2006.01)
*B29C 71/00* (2006.01)
*B29K 23/00* (2006.01)
*B29K 105/16* (2006.01)
*B29K 509/00* (2006.01)
*B29L 7/00* (2006.01)
*B29L 31/34* (2006.01)
*H01M 10/06* (2006.01)

(52) U.S. Cl.
CPC .......... *H01M 2/145* (2013.01); *H01M 2/162* (2013.01); *H01M 2/1646* (2013.01); *B29C 2071/0027* (2013.01); *B29K 2023/0683* (2013.01); *B29K 2105/16* (2013.01); *B29K 2509/00* (2013.01); *B29K 2995/0003* (2013.01); *B29K 2995/0068* (2013.01); *B29K 2995/0081* (2013.01); *B29L 2007/008* (2013.01); *B29L 2031/3468* (2013.01); *H01M 10/06* (2013.01); *H01M 2220/20* (2013.01); *Y02E 60/126* (2013.01); *Y02P 70/54* (2015.11)

(58) Field of Classification Search
CPC .......... H01M 2/166; B29L 2031/3468; B29L 2007/008; B29K 2995/0081; B29K 2995/0068; B29K 2995/0003; B29K 2509/00; B29K 2023/0683; B29K 2105/16; B29C 2071/0027; B29C 71/0009; B29C 47/0021; Y02E 60/126; Y02P 70/54
USPC ...................................... 429/250; 264/177.18
See application file for complete search history.

(56) References Cited

U.S. PATENT DOCUMENTS

| | | | |
|---|---|---|---|
| 4,578,414 A | | 3/1986 | Sawyer et al. |
| 5,336,573 A | | 8/1994 | Zuckerbrod et al. |
| 5,436,094 A | * | 7/1995 | Horimoto ............. D21H 13/14 |
| | | | 162/146 |
| 6,120,939 A | | 9/2000 | Whear et al. |
| 7,211,322 B2 | | 5/2007 | Pekala |
| 7,329,623 B2 | | 2/2008 | Kinn et al. |
| 2002/0001753 A1 | | 1/2002 | Pekala et al. |
| 2003/0193110 A1 | | 10/2003 | Yaritz et al. |
| 2004/0010909 A1 | | 1/2004 | Emanuel et al. |
| 2007/0190426 A1 | | 8/2007 | Matsunami et al. |
| 2011/0009309 A1 | | 1/2011 | Mertens et al. |
| 2011/0045339 A1 | * | 2/2011 | La ....................... H01M 2/1653 |
| | | | 429/163 |
| 2012/0145468 A1 | | 6/2012 | Pekala et al. |

FOREIGN PATENT DOCUMENTS

| | | | | |
|---|---|---|---|---|
| JP | 2005285688 A | | 10/2005 | |
| WO | 199219707 A1 | | 11/1992 | |
| WO | WO 98/52240 | * | 11/1998 | ............. H01M 2/16 |
| WO | 2002095846 A1 | | 11/2002 | |
| WO | 2005083816 A1 | | 9/2005 | |
| WO | WO 2012/174998 | * | 12/2012 | ............. H01M 2/16 |

* cited by examiner

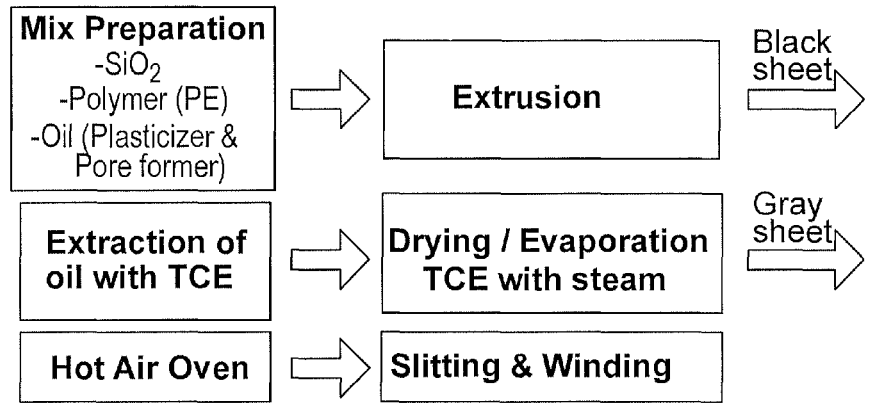
Fig. 1. Representative process flow diagram for separator manufacturing
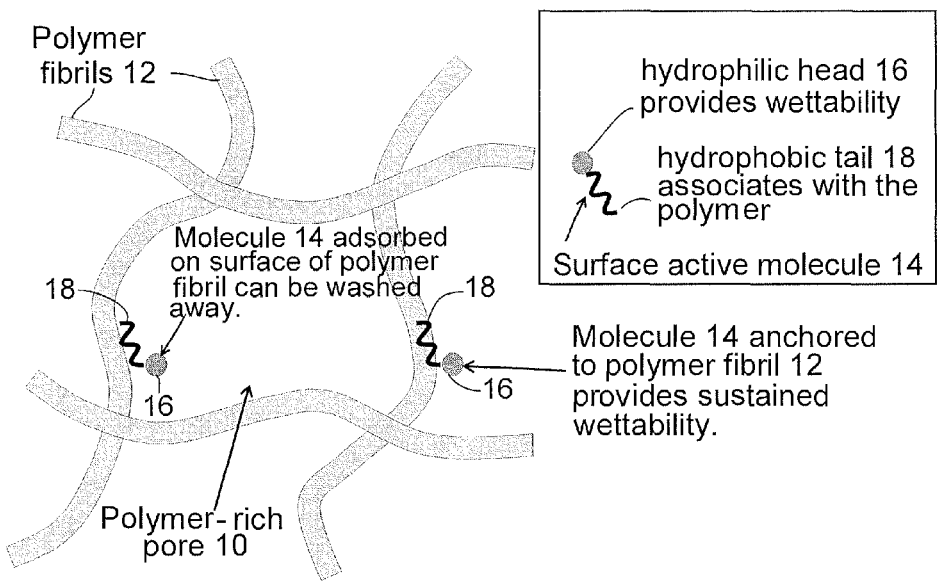
Fig. 1A. Illustration of adsorbed versus anchored surface active molecules for increasing the wettability of the polymer-rich pores.

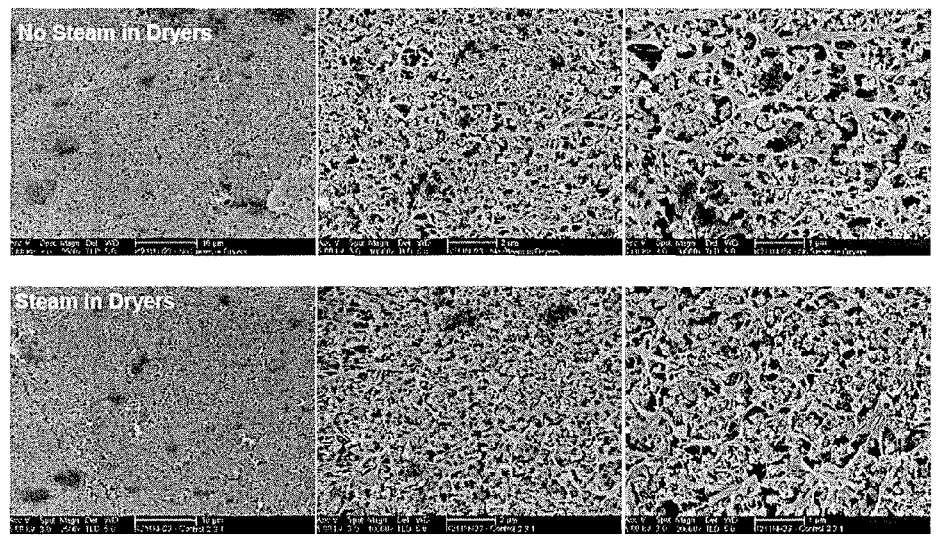
Fig. 2. Scanning electron micrographs (SEMs) showing, with increasing magnification, machine-direction fracture surfaces of separators manufactured with (Example 1) and without (Example 2) introduction of steam into the dryers

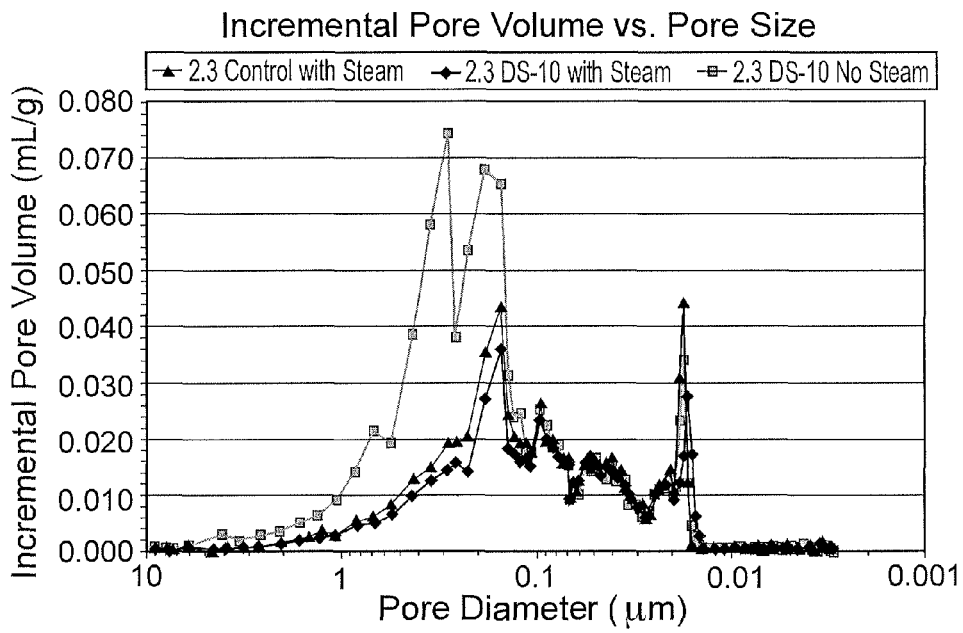
Fig. 3. Separator porosity and pore size distributions as determined with Hg porosimetry
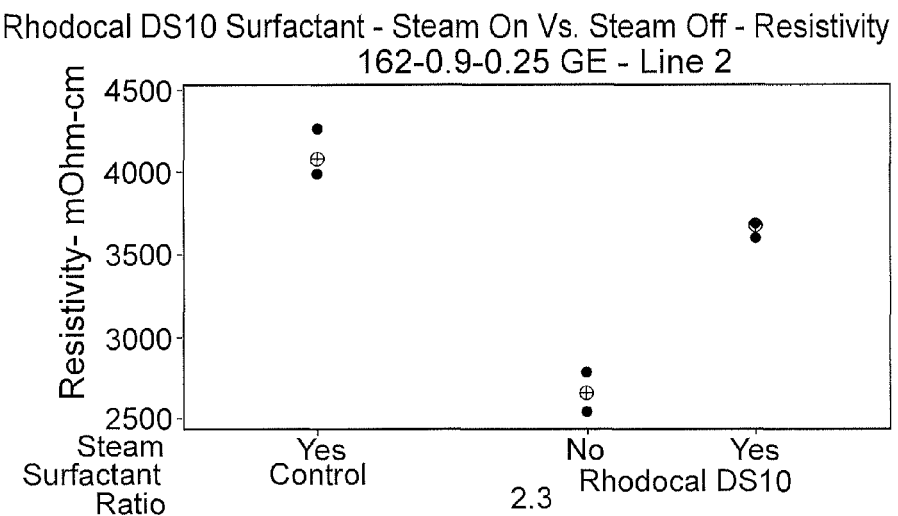
Fig. 4. Separator electrical resistivity values

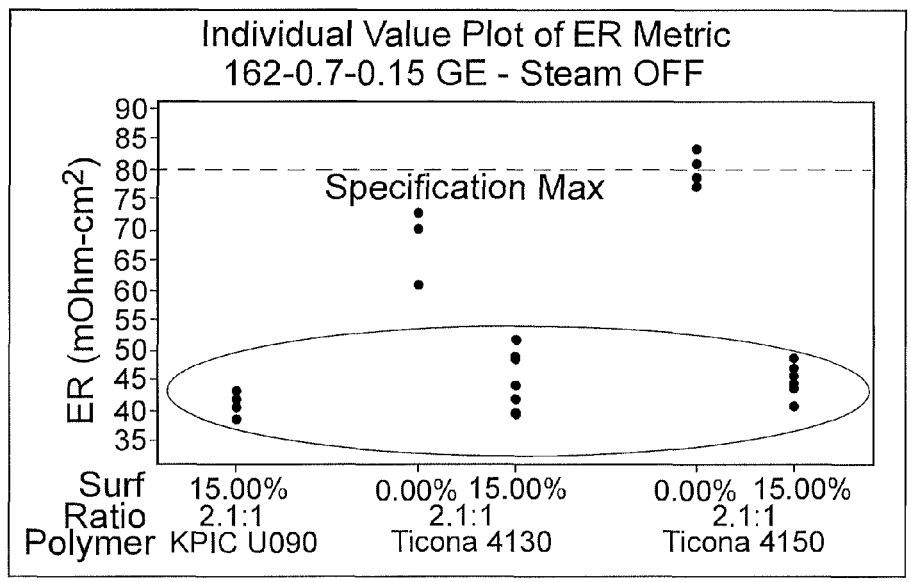
Fig. 5. Similar ER values for all formulations after surfactant addition
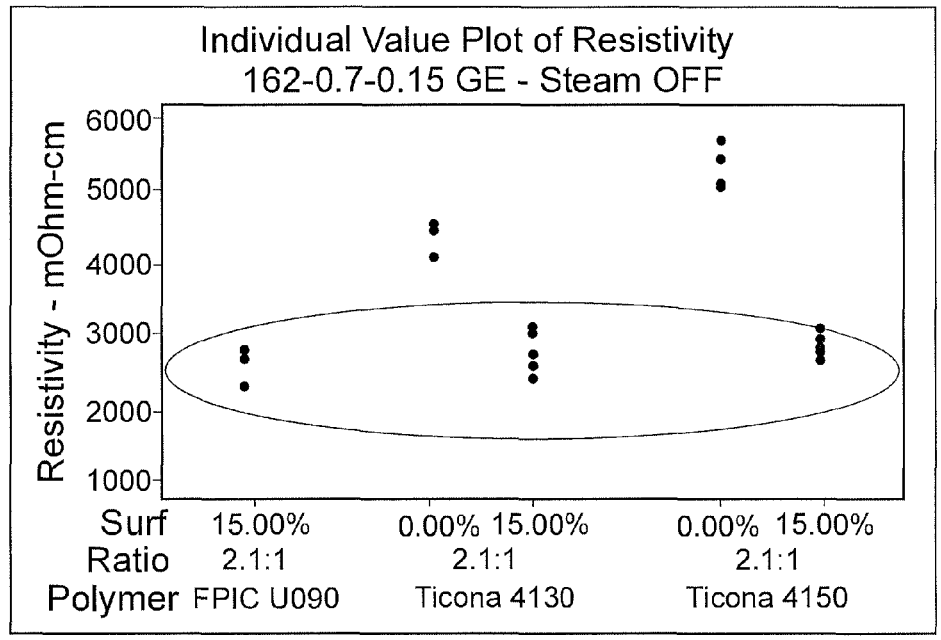
Fig. 6. Similar electrical resistivity values for all formulations after surfactant addition

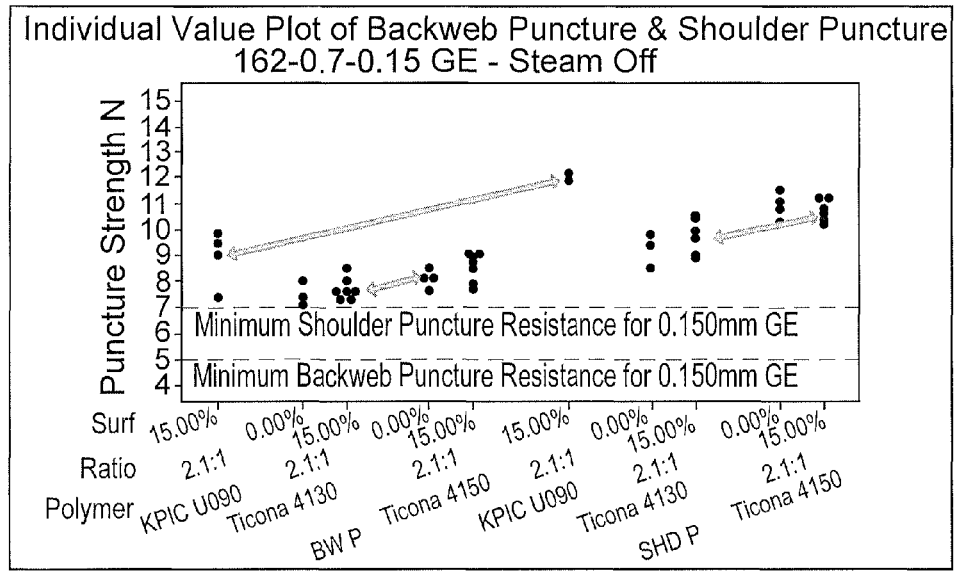
Fig. 7. KPIC U090 and Ticona 4150 give higher puncture strength than Ticona 4130
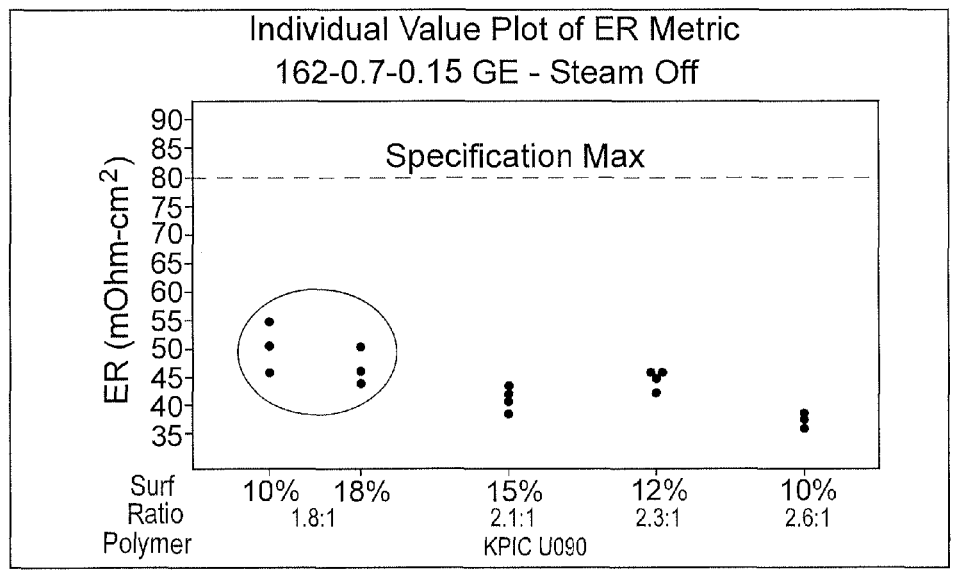
Fig. 8. Slightly higher ER was observed at $SiO_2/PE = 1.8$, and surfactant amount impacted average ER

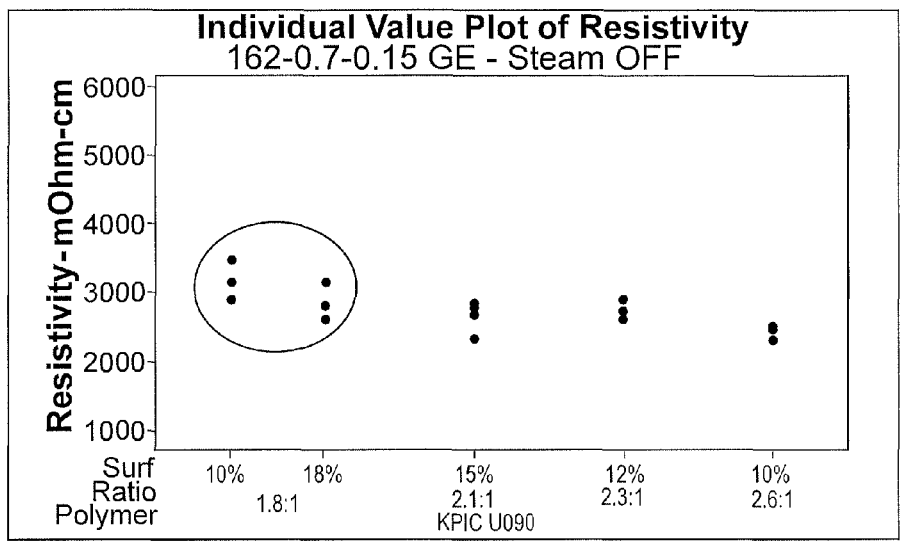
Fig. 9. Slightly higher electrical resistivity was observed at $SiO_2/PE = 1.8$, and surfactant amount impacted average ER
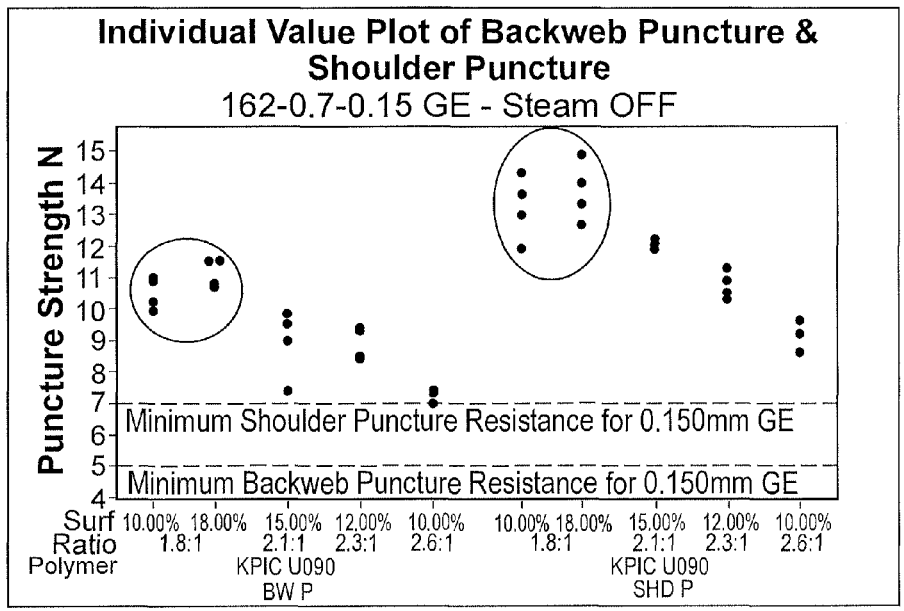
Fig. 10. Puncture strength is approximately 55% higher at $SiO_2/PE = 1.8$, as compared to $SiO_2/PE = 2.6$

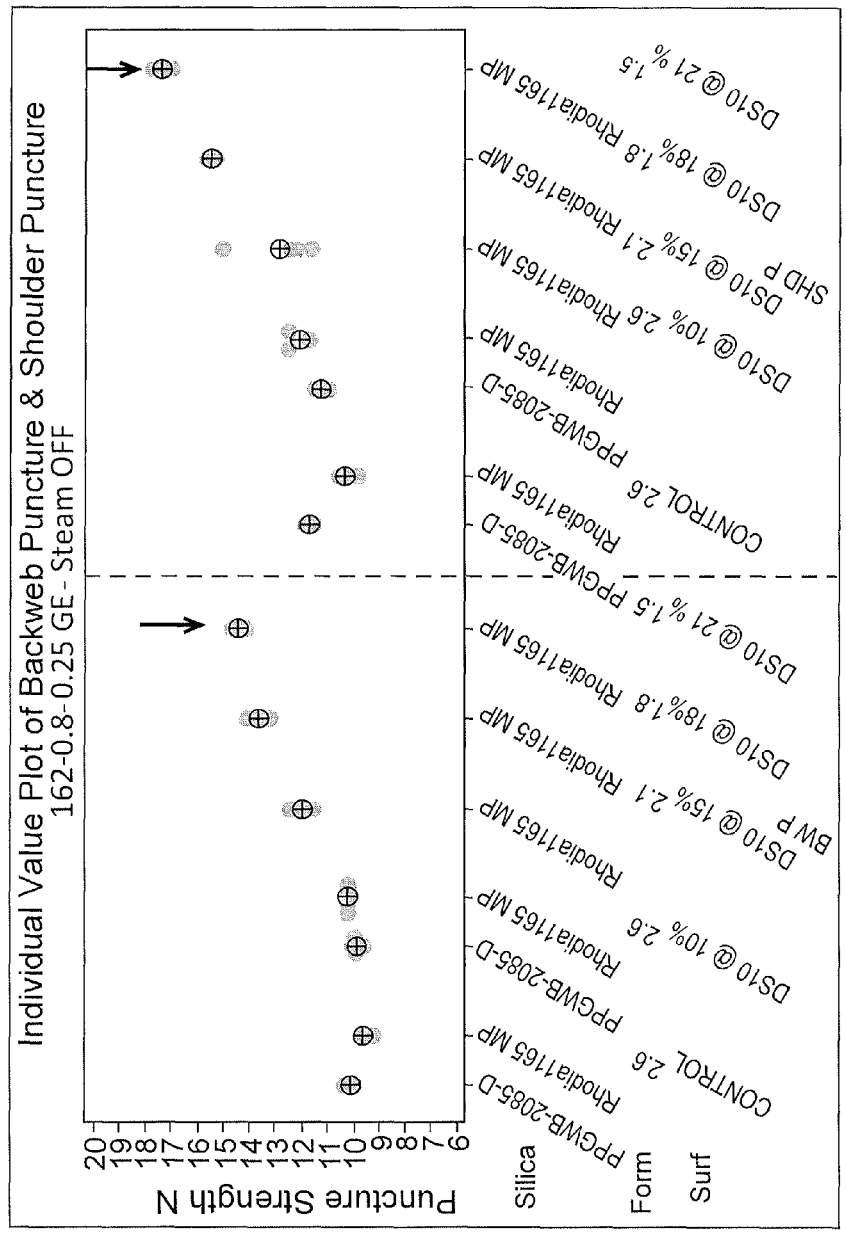
Fig. 11. Puncture strength increases as the SiO$_2$/PE ratio decreases. The highest puncture values for the 162- 0.8 - 0.25 GE profile were observed at SiO$_2$/PE = 1.5, as highlighted with arrows in the above graph.

LEAD-ACID BATTERY SEPARATORS WITH ULTRA LOW RESISTIVITY AND SUSTAINED WETTABILITY

RELATED APPLICATIONS

This application claims benefit of U.S. Patent Application Nos. 61/868,478 and 61/792,631, filed Aug. 21 and Mar. 15, 2013, respectively.

TECHNICAL FIELD

This invention relates to manufacture of separators for use in lead-acid batteries and, in particular, to the practice of specific process technologies and interface modifications for the manufacture of microporous separators installed in lead-acid batteries configured for use in extended cycling applications.

BACKGROUND INFORMATION

The lead-acid storage battery is commonly found in two modes of design: the valve-regulated recombinant cell and the flooded cell. Both modes include positive and negative electrodes typically in the form of plates that are separated from each other by a porous battery separator. The porous separator prevents the electrodes from coming into physical contact and provides space for an electrolyte to reside. Such separators are formed of materials that are chemically resistant to the sulfuric acid electrolyte and are sufficiently porous to permit the electrolyte to reside in the pores of the separator material, thereby permitting ionic current flow with low resistance between adjacent positive and negative electrode plates.

More recently, enhanced flooded batteries (EFB) have been developed to meet the high cycling requirements in "start-stop" or "micro-hybrid" vehicle applications. In such applications, the engine is shut off while the car is stopped (e.g., at a traffic light) and then re-started afterwards. The advantage of a "start-stop" vehicle design is that it results in reduced $CO_2$ emissions and better overall fuel efficiency. A major challenge to the operation of "start-stop" vehicles is that the battery must continue supply of all electrical functions during the stopped phase while supplying sufficient current to re-start the engine at the required moment. In such cases, the battery must exhibit higher performance with respect to cycling and recharge capability as compared to that of a traditional flooded lead-acid battery. In the case of "start-stop" applications, valve-regulated lead-acid (VRLA) batteries have demonstrated good cycleability in the field, but they suffer from relatively high cost and lower performance in high temperature environments. As such, EFB batteries offer reduced cost and an opportunity to overcome the limitations of VRLA batteries.

Separators for lead-acid storage batteries have been formed of different materials as the technology has developed. Sheets of wood, paper, rubber, PVC, fiberglass, and silica-filled polyethylene have all found use over time. Currently, absorptive glass mat (AGM) separators are used in VRLA batteries, while silica-filled polyethylene separators are used in automotive starting-lighting-ignition (SLI) batteries. In the latter separators, the microporous polyethylene separator web contains a large fraction of silica particles that function as a wettability component to provide wettability for the acid electrolyte and to help define the pore structure of the separator. A separator of this type is described in U.S. Pat. No. 7,211,322.

In the case of EFB batteries, it is desirable to use a silica-filled polyethylene separator that has exceptionally low electrical resistivity, maintains wettability, mitigates acid stratification, and exhibits good mechanical properties and high oxidation resistance. Conventional silica-filled polyethylene separators used in SLI batteries do not meet all the requirements for EFB batteries.

As such, there continues to be a need for a low-cost, ultralow resistance, silica-filled polyethylene separator that exhibits permanent wettability throughout the cycle life of lead-acid storage batteries used in EFB applications.

SUMMARY OF THE DISCLOSURE

A preferred microporous silica-filled polyethylene web has a material composition that is characterized by high porosity and a significant fraction (i.e., of up to about 60%) of pores of greater than 0.1 µm in diameter, and includes a modification to the polyethylene-pore interface using a surface active molecule that provides sustained wettability of the web after repeated washings. While certain surfactants have been commonly used in lead-acid battery separators, surface active molecules such as anionic surfactants have not been selected with regard to sustained wettability, which can be important to battery formation, life, and performance. A preferred surface active molecule is sodium dodecylbenzene sulfonate, which is one of a class of anionic surfactants known as linear alkylbenzene sulfonates, that provides durability to the wettability property of the silica-filled polyethylene web.

The other principal components of this preferred separator formulation include an ultrahigh molecular weight polyethylene (UHMWPE) matrix that provides the strength and mechanical integrity of the separator, precipitated silica that enhances wettability so that the sulfuric acid electrolyte may more easily wick through the pores, and residual plasticizer that provides some protection against oxidation. It is believed that surfactants with long alkyl side chains, such as sodium dodecylbenzene sulfonate, can interact with UHMWPE during the extrusion process such that it becomes "anchored" to the polymer matrix and cannot be easily washed away.

Additional aspects and advantages will be apparent from the following detailed description of preferred embodiments, which proceeds with reference to the accompanying drawings.

BRIEF DESCRIPTION OF THE DRAWINGS

FIG. 1 is a separator manufacturing process flow diagram.

FIG. 1A is a diagram of a polymer-rich pore of a polymer web, showing why, by comparison of the structural properties of anchored and adsorbed surface active molecules, only the anchored surface active molecules achieve sustained wettability of the polymer web.

FIG. 2 presents upper and lower rows of three scanning electron micrographs (SEMs) showing, with increasing magnification, machine-direction fracture surfaces of separators manufactured without and with, respectively, steam introduced during the drying process.

FIG. 3 is a graph showing a set of incremental pore volume versus pore size curves for use in determining separator porosity and pore size distribution.

FIG. 4 is a graph showing electrical resistivity values of separators incorporating surfactant with and without introduction of steam in the drying process.

FIGS. 5, 6, and 7 are graphs showing, respectively, electrical resistance, electrical resistivity, and puncture strength of sample separators made from three different polymer grades.

FIGS. 8, 9, and 10 are graphs showing, respectively, electrical resistance, electrical resistivity, and puncture strength of separators made of KPIC U090 polymer and having silica-to-polyethylene mass ratios of 1.8:1, 2.1:1, 2.3:1, and 2.6:1.

FIG. 11 is a graph showing puncture strength of separators made with KPIC U090 polymer and having silica-to-polyethylene mass ratios ranging from 1.5:1 to 2.6:1.

DETAILED DESCRIPTION OF PREFERRED EMBODIMENTS

A lead-acid battery separator with ultralow resistivity results from high porosity, controlled pore size distribution, and an ionic surfactant with a long alkyl side chain that is anchored to the polymer matrix of a silica-filled polyethylene separator to provide sustained wettability.

During the manufacture of lead-acid battery separators, precipitated silica is typically combined with a polyolefin, a process oil (i.e., plasticizer), and various minor ingredients to form a separator mixture that is extruded at an elevated temperature through a sheet die to form an oil-filled sheet. The oil-filled sheet is calendered to its desired thickness and profile, and the majority of the process oil is then extracted with a solvent. Once the oil has been extracted to its target level, the solvent-laden sheet then passes into a dryer. As the solvent is evaporated from the sheet, capillary pressure is exerted on the pore walls. The temperature and air flow in the dryer are set to control the rate of evaporation of the solvent to minimize pore wall collapse and a consequent dimensional shrinkage of the sheet. The capillary pressure depends upon surface tension of the solvent, the contact angle, and the pore radius as shown in the following equation:

$$P_c = (-2\gamma_{LV} \cos \Theta)/r,$$

where $P_c$ equals capillary pressure, $\gamma_{LV}$ is surface tension at the liquid-vapor interface, $\Theta$ is the contact angle, and $r$ equals pore radius. Such capillary pressure can lead to the collapse or contraction of the pores, resulting in dimensional shrinkage and smaller pore size distribution in the finished separator sheet. The capillary pressure is governed by the surface tension of the extraction solvent—the higher the surface tension, the higher the capillary pressure, and thus the higher the separator shrinkage. The rate of solvent evaporation can also impact the amount of separator shrinkage and pore structure. In general, the separator sheet after extraction and drying has a final width and rib spacing that is about 70%-85% of that in the calendered, oil-filled sheet.

The resultant microporous polyolefin separator sheer is then slit to the appropriate width for a specific battery design. FIG. 1 shows a representative process flow diagram for the manufacture of silica-filled polyethylene separators.

Ultrahigh molecular weight polyethylene (UHMWPE) having an intrinsic viscosity of at least 20 deciliters/gram is preferred, and more preferably within a viscosity range of about 25-30 deciliters/gram, to form a polymer web including a three-dimensional polyolefin matrix. Although there is no preferred upper limit for the intrinsic viscosity, current commercially available UHMWPEs have an upper intrinsic viscosity limit of about 36 deciliters/gram. Although UHMWPE is commonly available, it is difficult to process into fiber, sheet, or membrane form. The high melt viscosity requires a compatible plasticizer and a twin screw extruder for disentanglement of the polymer chains such that the resultant gel can be processed into a useful form. This approach is commonly referred to as "gel processing."

A preferred process oil, i.e., plasticizer, used during extrusion is one in which UHMWPE dissolves and is a nonevaporative liquid solvent at room temperature. For UHMWPE, the solvating temperature would be above about 160° C., and preferably in the range of between about 180° C. and about 240° C. It is preferred to use a processing oil, such as a paraffinic oil, naphthenic oil, aromatic oil, or a mixture of two or more such oils. Examples of suitable processing oils include: oils sold by Shell Oil Company, such as Gravex™ 942; oils sold by Calumet Lubricants, such as Hydrocal™ 800; and oils sold by Nynas Inc., such as HR Tufflo® 750. A processed separator typically contains between about 12 wt. % to about 21 wt. % residual process oil.

Any solvent for extracting the process oil from the polymer web may be used in the extraction process. Preferably, the solvent has a boiling point that makes it practical to separate the solvent from the plasticizer. Exemplary solvents include trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane; and toluene. Extracting the process oil from the polymer web forms available interconnecting pores that have surfaces and communicate through the thickness of the polymer web. The available interconnecting pores include a first number of pores having electrolyte-wettable surfaces resulting from a presence of the wettability component in sufficiently high concentrations and a second number of pores having electrolyte-nonwettable surfaces resulting from an absence of the wettability component in sufficiently high concentrations. The battery separator formed from the polymer web is characterized by a porosity and an electrical resistivity when an electrolyte penetrates the first number of pores.

Exemplary minor ingredients incorporated into the UHMWPE web include antioxidants, colorants, pigments, residual plasticizer or process oil, waxes, lubricants, other polymers, and processing aids.

Primary purposes of the polyolefin matrix contained in the separator are to (1) provide mechanical integrity to the polymer web so that the separator can be enveloped at high speeds and (2) to prevent grid wire puncture during battery assembly or operation. Thus, the hydrophobic polyolefin preferably has a molecular weight that provides sufficient molecular chain entanglement to form a microporous web with high puncture resistance. A primary purpose of the hydrophilic silica is to increase the acid wettability of the separator web, thereby lowering the electrical resistivity of the separator. In the absence of silica, the sulfuric acid would not wet the hydrophobic web and ion transport would not occur, resulting in an inoperative battery. Consequently, the silica wettability component of the separator typically accounts for between about 55 wt. % and about 70 wt. % by weight of the separator, i.e., the separator has a silica-to-polyethylene weight ratio of between about 1.8:1 and about 4.6:1. Even at these high silica concentrations, there are still "polymer rich" pores that are not accessible to water or acid.

Some manufacturers have attempted to improve the wettability of the separator with corona treatment, but this surface effect is known to decrease rapidly over time. In a second approach, some separator manufacturers have used surfactants to improve separator wettability and lower electrical resistance through better initial wetting of the available pores. In some cases, the surfactant is known to either degrade or negatively impact, or both, lead-acid battery performance.

As such, it is desirable to select a surfactant that becomes "anchored" to the polymer matrix of the separator web such that the surfactant cannot be easily removed or washed away, thereby sustaining the wettability of the separator web. Finally, controlling the number of and volume occupied by the pores (i.e., percent porosity) and pore size distribution of the separator web achieves a further reduction in electrical (ionic) resistivity.

The following describes how the disclosed surface active molecule becomes anchored to the polymer matrix through its hydrophobic tail and thereby sustains the wettability of the polymer web. The pore volume of the separator is defined by the surfaces of both the silica particles and the polymer fibrils. Most of the pores have some silica surface that is readily wetted by the sulfuric acid electrolyte, but there are some pores that are defined completely by polymer surfaces that are not wetted by the electrolyte. The role of the surface active molecules is to modify the polymer fibrils so that it can be wetted by the electrolyte. The surface active molecule can do so because it is comprised of two regions with different characteristics with respect to wetting: a hydrophobic region that is attracted to the polymer surface and a hydrophilic region that faces away from the polymer surface. Once the surface active molecules are incorporated into the separator, the electrolyte sees the hydrophilic region of the molecules instead of the underlying polymer surfaces and is able to fill pores that could not have been filled before because they were defined only by polymer surfaces.

There are two methods of incorporating the surface active molecules into the separator. They can be added directly to the separator mixture before extrusion, or they can be coated or sprayed onto the separator with a solution with water or other solvent after the separator has been extracted. In the first method, the hydrophobic region can become anchored or embedded in the polymer fibrils while the hydrophilic region sits on the surface of the fibrils. The processing temperature of between about 160° C. and about 240° C. in the extrusion of UHMWPE imposes a requirement that the surface active molecule survive by remaining thermally stable at such temperatures. In the second method, the hydrophobic region can adsorb onto the surface of the fibril, with the hydrophilic region facing away from the surface. Both methods may increase the wettability of the polymer web, but only the first method will produce sustained wettability because the molecules are anchored to the polymer fibrils such that they cannot be washed away.

FIG. 1A shows a polymer-rich pore 10 that is defined entirely by the surfaces of polymer fibrils 12. Also shown are surface active molecules 14 that have a hydrophilic region or head 16 and a hydrophobic region or tail 18. FIG. 1A shows how surface active molecules 14 can either be adsorbed on the surface of polymer fibril 12, where they are subject to being washed away, or be anchored to polymer fibril 12, where they are permanently fixed and thereby provide sustained wettability. The surface active molecules need not be limited to a specific class. Molecules that are nonionic, anionic, cationic, and amphoteric may be useful as long as the hydrophobic region can become anchored to the polyolefin matrix. An additional limitation on cationic surfactants is that they cannot use a halide (F, Cl, Br, I) as the counter ion. Examples of candidate of nonionic molecules are block copolymers of polyethylene glycol and polypropylene glycol, and block copolymers of polyethylene oxide and polypropylene oxide. Examples of candidate anionic molecules are alkyl ether carboxylates, sulfates of fatty acid alcohols, linear alkyl benzene sulfonates, and phosphate esters. A preferred surface active molecule includes a linear alkylbenzene sulfonate with an alkyl moiety of minimum alkyl chain length of C8 and, more preferably, an alkyl chain length from C10 to C16.

The following are nine examples of silica-filled polyethylene separators constructed for comparative analysis of their properties.

Example 1

The following materials were place in a batch mixer and blended together:
44 kg UHMWPE (U090; KPIC)
120 kg Precipitated silica (1165 MP milled; Rhodia)
75 kg Recycled pellets (65% oil+25% silica+10% UHMWPE)
3.23 kg Colorant (50% C black+50% HDPE)
0.58 kg Antioxidant (hindered phenol)
0.58 kg Lubricant (Ca/Zn stearate).

Next, 69.6 gals (263.4 liters) of Nytex 820 oil were sprayed onto the blended materials under agitation to form a mixture having the consistency of damp sand. This mixture was then fed to a counter-rotating twin screw extruder at 660 kg/hr. Additional oil was added in-line at the extruder to bring the final oil content to about 66 wt. %. The melt temperature was approximately 231° C. as the melt passed through the sheet die and entered into the calender stack, where the rib pattern and thickness were controlled. The oil-filled sheet was subsequently extracted with trichloroethylene (TCE) and then dried to form the final separator. During the drying process, steam was used to evaporate the TCE in the dryer so that the majority of the solvent could be condensed into liquid form to minimize the amount of TCE vapor directed to a carbon bed recovery system.

The separator sheet was slit in-line into individual rolls having a 162 mm×0.9 mm×0.25 mm profile—these dimensions representing the respective width, overall height, and backweb thickness of the separator. The final separator had a silica-to-polyethylene mass ratio of 2.3:1, as measured by thermogravimetric analysis.

Example 2

Separators were manufactured in accordance with the formulation and process conditions outlined in Example 1, except that TCE was allowed to evaporate from the sheet with no steam delivered to the dryer.

Example 3

Separators were manufactured in accordance with the formulation and process conditions outlined in Example 1, except that the sheet was dip-coated with a 2.5 wt. % aqueous solution of sodium dihexyl sulfosuccinate (Aerosol® MA-80; Cytec Industries) prior to entering the hot air oven. The finished separator rolls had high moisture content (about 30 wt. %) because of the limited path length and short residence time they underwent in the hot air oven (see FIG. 1). Separator samples were further dried in a convection oven at 105° C. prior to testing.

Example 4

Separators were manufactured in accordance with the formulation and process conditions outlined in Example 1, except that 5.3 kg of sodium dodecylbenzene sulfonate (Rhodacal® DS-10; Rhodia) was added into the mix formulation.

Example 5

Separators were manufactured in accordance with the formulation and process conditions outlined in Example 4, except that TCE was allowed to evaporate from the sheet with no steam delivered to the dryer.

Example 6

Separators were manufactured in accordance with the formulation and process conditions outlined in Example 1, except that 48 kg of UHMWPE (U090; KPIC) was used, 7.2 kg of sodium dodecylbenzene sulfonate (Rhodacal® DS-10; Rhodia) was added into the mix formulation, and the TCE was allowed to evaporate from the sheet with no steam delivered to the dryer.

The final separator had a silica-to-polyethylene mass ratio of 2.1:1, as measured by thermogravimetric analysis.

Example 7

Separators were manufactured in accordance with the formulation and process conditions outlined in Example 1, except that 40 kg of UHMWPE (U090; KPIC) was used, 4.0 kg of sodium dodecylbenzene sulfonate (Rhodacal® DS-10; Rhodia) was added into the mix formulation, and the TCE was allowed to evaporate from the sheet with no steam delivered to the dryer.

The final separator had a silica-to-polyethylene mass ratio of 2.6:1, as measured by thermogravimetric analysis.

Example 8

Separators were manufactured in accordance with the formulation and process conditions outlined in Example 1, except that 54 kg of UHMWPE (U090; KPIC) was used, 9.7 kg of sodium dodecylbenzene sulfonate (Rhodacal® DS-10; Rhodia) was added into the mix formulation, and the TCE was allowed to evaporate from the sheet with no steam delivered to the dryer.

The final separator had a silica-to-polyethylene mass ratio of 1.8:1, as measured by thermogravimetric analysis.

Example 9

Separators were manufactured in accordance with the formulation and process conditions outlined in Example 1, except that 60 kg of UHMWPE (U090; KPIC) was used, 12.6 kg of sodium dodecylbenzene sulfonate (Rhodacal® DS-10; Rhodia) was added into the mix formulation, and the TCE was allowed to evaporate from the sheet with no steam delivered to the dryer.

The final separator had a silica-to-polyethylene mass ratio of 1.5:1, as measured by thermogravimetric analysis.

Analytical Test Data

During the manufacture of battery separators with and without steam introduced into the dryers, large differences in transverse direction shrinkage and sheet width were observed prior to the slitting and winding operation. FIG. 2 shows two rows of scanning electron micrographs (SEMs) for comparison of separator samples manufactured under each of these conditions (Examples 1 and 2). The dimension scales of the left, center, and right SEMs of each row are, respectively, 10 μm (2500× magnification), 2 μm (10000× magnification), and 1 μm (20000× magnification). FIG. 2 reveals little difference in the morphology of separators manufactured under these different drying conditions (with and without steam).

In contrast, Hg intrusion porosimetry (AutoPore IV 9500; Micromeritics) clearly reveals the impact of the drying process on the porosity and pore size distribution of the final separator, as shown in FIG. 3. The amount of porosity is represented by the integrated area under the distribution curve for each separator sample, and the pore size distribution is shown on the abscissa. In the case of the samples manufactured with steam introduced into the dryers, the two curves almost overlap, which indicates that the amount of porosity and the pore size distribution are similar, independent of the presence of DS-10 surfactant (Examples 1 and 4). In the case in which no steam was used in the drying process (Example 5), the amount of porosity increased and the pore size distribution shifted to a large average value. In the FIG. 3, the Hg intrusion curves for the separator samples manufactured with steam reveal that larger pores of between 0.1 μm and 5 μm diameter account for 35% and 32% of the total porosity in the sample produced with and without the DS-10 surfactant, respectively. In comparison, for the separator sample manufactured without steam, 54% of the total porosity in the sample comes from larger pores in the same diameter range. The separators shown in FIG. 3 were manufactured with a $SiO_2$:PE ratio of 2.3:1. Similar increases in total porosity and percent contribution to the total porosity from larger pores were seen for separators manufactured at $SiO_2$:PE ratios of 2.1 and 2.6 when no steam was introduced in the drying step, as compared to the standard separator manufactured by ENTEK Limited (162-0.9-0.25GE), which has $SiO_2$:PE ratio of 2.6:1 and in which steam was used in the drying step. These increases are shown in Table 1 below.

TABLE 1

Comparison of Separator Porosity.

| Separator Description | Total Porosity (%) | Fraction of Total Porosity Contributed By Pores Between 0.1 μm and 5 μm diameter |
|---|---|---|
| Standard separator, 162-0.9-0.25GE, 2.6 s/p, with steam | 58 | 39% |
| 2.1 s/p, 15% DS-10, no steam, Example 6 | 60 | 52% |
| 2.3 s/p, 12% DS-10, no steam, Example 5 | 63 | 54% |
| 2.6 s/p, 10% DS-10, no steam, Example 7 | 64 | 54% |

The electrical resistance values for the above lead-acid battery separators shown in FIG. 3 were measured in accordance with Battery Council International (BCI) Test Methods (BCI-03B) using a Palico Measurement System (Caltronics). Briefly, 0.6 g-1.0 g sample separators were boiled separately in water for 10 minutes and then soaked in sulfuric acid (sp.gr.=1.28) for 20 minutes before placing single pieces into the Palico Measurement System. Resistance values were then recorded in ohm-cm². These values were then divided by the backweb thickness (expressed in cm) for the individual samples to give the electrical resistivity values (ohm-cm) shown in FIG. 4. The data reveal that there is a reduction in electrical resistivity by simply incorporating the sodium dodecylbenzene sulfonate surfactant in the formulation (Example 4), but a much larger reduction is achieved when "no steam" drying (Example 5) is combined with this same surfactant. As a reference point, the electrical resistivity of sulfuric acid (sp.gr.=1.28; 27° C.) is 1250 mOhm-cm.

A modified version of the BCI Acid Drop test was used to evaluate separator wettability. A separator sample was placed on a ring stand above a lighted mirror. A drop of distilled water of fixed volume was placed on the surface of the separator, and the mirror and a stop watch were used to accurately measure the time to fully penetrate the backweb. Three measurements were made for each type of separator.

The separators manufactured with sodium dodecylbenzene sulfonate were washed multiple times with water, yet their subsequent wetting times remained stable, thereby exhibiting durability of wettability, as shown in Table 3 below. These results indicate that separators incorporating an ionic surfactant that is anchored to the polyethylene fibrils can sustain the wettability of the polymer web after multiple washing and drying steps.

TABLE 3

Wetting Durability Results.

| Example No. Description | Sample wt (g) | First extracted wt (g) | Second extracted wt (g) | Third extracted wt (g) | Wet-time 1 (s) | Wet-time 2 (s) | Wet-time 3 (s) | Wet-time 4 (s) | First weight change (%) | Second weight change (%) | Third weight change (%) | First wet-time change (s) | Second wet-time change (s) | Third wet-time change (s) |
|---|---|---|---|---|---|---|---|---|---|---|---|---|---|---|
| No. 4 2.3 s/p, 10% Rhodacal DS-10 with steam | 0.7589 0.7229 0.7606 | 0.7501 0.7109 0.7496 | 0.7405 0.7072 0.7431 | 0.7395 0.7038 0.7407 | 4.0 3.4 3.1 | 3.8 3.9 3.1 | 3.6 3.8 3.5 | 3.3 3.8 3.3 | −1.160 −1.660 −1.446 | −1.280 −0.520 −0.867 | −0.135 −0.481 −0.323 | −0.2 0.5 0.0 | −0.2 −0.1 0.4 | −0.3 0.0 −0.2 |
| No. 5 2.3 s/p, 10% Rhodacal DS-10 no steam | 0.6384 0.6084 0.6617 | 0.6287 0.5998 0.6537 | 0.6242 0.5942 0.6491 | 0.6242 0.5941 0.6501 | 12.2 11.5 10.5 | 5.3 5.6 5.6 | 4.1 5.7 4.9 | 4.2 5.1 4.9 | −1.519 −1.414 −1.209 | −0.716 −0.934 −0.704 | 0.000 −0.017 −0.154 | −6.9 −5.9 −4.9 | −1.2 0.1 −0.7 | 0.1 −0.6 0.0 |

Next, the 0.6 g-1.0 g separators were individually washed for 15 minutes in 3.5 liters of agitated distilled water and then dried in a hot air oven at 105° C. for 5 minutes. The above wettability test was then repeated on the same separators.

Table 2 below presents the wettability results for four different separators. On average, each separator lost some mass after its initial water soak. This indicates that there is likely some water-soluble component of the residual oil in the separator. The separator manufactured by dip coating with an aqueous solution sodium dihexyl sulfosuccinate lost the most mass. Moreover, this separator was the only one of the four separators tested that exhibited an increased average wetting time after the initial wash. This result would be expected for the case in which sodium dihexyl sulfosuccinate was adsorbed to the polymer fibrils, rather than anchored to them.

TABLE 2

Wettability Data.

| Example No. Description | Sample wt (g) | Extracted wt (g) | Wet time 1 (s) | Wet time 2 (s) | Weight change (%) | Wet time change (s) |
|---|---|---|---|---|---|---|
| No. 1 2.3 s/p, control with steam | 0.7558 0.6917 0.7343 | 0.7595 0.6862 0.7297 | 8.3 8.0 8.5 | 5.7 5.5 4.6 | 0.490 −0.795 −0.626 | −2.6 −2.5 −3.9 |
| No. 3 2.3 s/p, MA80 dip coated with steam | 0.8623 0.8365 0.8107 | 0.8327 0.8105 0.7853 | 3.2 2.8 3.0 | 3.9 4.2 4.4 | −3.433 −3.108 −3.133 | 0.7 1.4 1.4 |
| No. 4 2.3 s/p, 10% Rhodacal DS-10 with steam | 0.7589 0.7229 0.7606 | 0.7501 0.7109 0.7496 | 4.0 3.4 3.1 | 3.8 3.9 3.1 | −1.160 −1.660 −1.446 | −0.2 0.5 0.0 |
| No. 5 2.3 s/p, 10% Rhodacal DS-10 no steam | 0.6384 0.6084 0.6617 | 0.6287 0.5998 0.6537 | 12.2 11.5 10.5 | 5.3 5.6 5.6 | −1.519 −1.414 −1.209 | −6.9 −5.9 −4.9 |

A further demonstration of the anchoring of the surface active molecules in the polymer fibrils can be seen by analyzing the results of soluble organic carbon (SOC) testing for separators made according to this disclosure as compared to SOC testing results for a standard, control separator manufactured by Entek international Ltd. The standard, control separator was manufactured at a silica/PE mass ratio of 2.6, with steam drying and no surface active molecule in the formulation. As its name implies, the SOC test assays the leachable organic carbon in a separator sample. First, a leachate is prepared by refluxing 10 grams of dried separator in 150 ml of sulfuric acid, with a specific gravity of 1.265. The leachate becomes the test solution for the analyzer. The organic carbon analyzer pumps a leachate aliquot into a reactor. Organic compounds in the leachate are oxidized to $CO_2$ by a potassium persulfate solution and UV light. The $CO_2$ is swept from solution and through an infrared detector with a stream of oxygen. The IR signal is integrated and compared to that received from a standard. The result is reported in microgram of carbon/mL of solution, which can be related to ppm of the separator sample.

As shown in Table 4 below, the standard, control separator does not contain a surface active molecule in the formulation, and it has a soluble organic carbon content of 10.1 ppm. This can be attributed to the small fraction of soluble species in the residual process oil that remains in the separator. The separators made according to the disclosure with a surface active molecule, DS-10, added to the mixture before extrusion and with different silica:PE ratios exhibit SOC values that are similar to those of the control separator. The SOC value that would result if all of the dodecylbenzene sulfonate (DS-10) was soluble in the leachate can be calculated from the carbon content in the molecule and the amount that was added to the mixture before extrusion. These values are also shown in Table 4 and are several orders of magnitude larger than the measured values. This indirectly supports the concept of anchoring of the hydrophobic portion of the surface active molecule since, if the surface active molecules were not anchored in the polymer fibrils and were able to dissolve into the leachate, much higher SOC values would be expected than those actually observed.

TABLE 4

Soluble Organic Carbon Data.

| | silica:PE ratio | SOC (ppm) | Calculated from DS-10 (ppm) |
|---|---|---|---|
| Standard, control separator | 2.6 | 10.1 | — |
| Example 7 | 2.6 | 11.1 | 19083 |
| Example 5 | 2.3 | 9.1 | 25307 |
| Example in FIGS. 5 and 6 | 2.1 | 16.1 | 34043 |

FIGS. 5, 6, and 7 are graphs showing, respectively, electrical resistance, electrical resistivity, and puncture strength of sample separators from the three different polymer grades. The different grades of polymer used were KPIC U090 ($9 \times 10^6$ g/mol), Ticona 4130 ($6.8 \times 10^6$ g/mol), and Ticona 4150 ($9.2 \times 10^6$). The separators from each polymer grade had a silica/PE mass ratio of 2.1:1. For each polymer grade, the separators had amounts of surfactant set at 0.0 wt. % and 15 wt. % of the virgin UHMWPE in the starting/initial mix. FIGS. 5 and 6 show similar respective electrical resistance (ER) and electrical resistivity values for the formulations using the different grades of polymer and the added surfactant. These electrical resistance and electrical resistivity values are lower than the corresponding values obtained for separator formulations from which surfactant was omitted. FIG. 7 shows higher backweb puncture (BW P) strengths and shoulder puncture (SHD P) strengths for separators manufactured with the KPIC U090 and Ticona 4150 polymers as compared to those with the Ticona 4130 polymer.

FIGS. 8, 9, and 10 are graphs showing, respectively, electrical resistance, electrical resistivity, and puncture strength of separators made with KPIC U090 polymer and having silica/PE mass ratios of 1.8:1, 2.1:1, 2.3:1, and 2.6:1. FIGS. 8 and 9 show (1) slightly higher respective electrical resistance and resistivity values at silica/PE mass ratio of 1.8:1 and (2) impact by surfactant amount on respective average electrical resistance and electrical resistivity values. Once again, the percent surfactant is based upon the amount of virgin UHMWPE in the starting/initial mix. FIG. 10 shows about 55% higher backweb and shoulder puncture strengths at silica/PE mass ratio of 1.8:1 than for those at silica/PE mass ratio of 2.6:1.

FIG. 11 shows that a further improvement to puncture strength of separators made with KPIC U090 polymer can be achieved at silica/PE=1.5. It is believed that separators can be manufactured at even lower silica/PE mass ratios to give even higher puncture strength while maintaining low electrical resistivity, provided that the appropriate amount of a surface active molecule (e.g., DS-10) is added in the formulation to ensure wettability of the available porosity.

Table 5 below expresses, for each of the six silica/PE mass ratios, a corresponding volume ratio in the separators produced. Volume ratio is calculated by taking the mass of each component and dividing by its respective skeletal density (silica=2.15 g/cc; UHMWPE=0.93 g/cc). Table 5 shows that, in separator samples made at silica/PE=1.2, the volume of the silica is about one-half of the volume of the polyethylene present.

TABLE 5

Comparison of Mass Ratio and Volume Ratio.
$SiO_2/PE$

| Mass Ratio | Volume Ratio |
|---|---|
| 1.2 | 0.519 |
| 1.5 | 0.649 |
| 1.8 | 0.779 |
| 2.1 | 0.909 |
| 2.3 | 0.995 |
| 2.6 | 1.125 |

The results presented in FIGS. 5-11 are summarized as follows. Enhanced flooded battery separators manufactured with various grades of UHMWPE and at a silica/PE mass ratio at least as low as 1.5 afford greater porosity from delivery of no steam during the drying stage. The polymer type had no major impact on electrical resistance at a fixed silica/PE mass ratio, but higher molecular weight grades benefited puncture strength. Ultralow electrical resistance was demonstrated over a broad range of compositions (i.e., silica/PE ratios) using added surfactant and delivery of no steam during drying. In general, a higher number of surface active molecules is required as the silica/PE mass ratio decreases in order to access more of the available polymer-rich pores.

It will be obvious to those having skill in the art that many changes may be made to the details of the above-described embodiments without departing from the underlying principles of the invention. The scope of the invention should, therefore, be determined only by the following claims.

The invention claimed is:

1. An extruded microporous polymer web configured for use as a battery separator, the microporous polymer web having first and second major surfaces, comprising:
    an inorganic wettability component;
    a surface active molecule containing a hydrophobic tail component and distributed throughout the extruded microporous polymer web during extrusion, the hydrophobic tail component of the surface active molecule anchored to a three-dimensional matrix of polyolefin; and
    the three-dimensional matrix of polyolefin defining interconnecting pores that provide overall first major surface-to-second major surface fluid permeability, the interconnecting pores having electrolyte-wettable surfaces resulting from dispersion of the inorganic wettability component and anchoring of the surface active molecule to the three-dimensional matrix of polyolefin to provide sustained wettability and low electrical resistivity.

2. The microporous polymer web of claim 1, in which the surface active molecule containing a hydrophobic tail component is selected from a group including block copolymers of polyethylene glycol and polypropylene glycol, block copolymers of polyethylene oxide and polypropylene oxide, alkyl ether carboxylates, sulfates of fatty acid alcohols, linear alkyl benzene sulfonates, and phosphate esters.

3. The microporous polymer web of claim 1, in which the surface active molecule includes a linear alkylbenzene sulfonate with an alkyl moiety of minimum alkyl chain length of C8.

4. The microporous polymer web of claim 3, in which the alkyl moiety has an alkyl chain length from C10 to C16.

5. The microporous polymer web of claim 1, in which the surface active molecule is sodium dodecylbenzene sulfonate.

6. The microporous polymer web of claim 1, in which the inorganic wettability component includes a siliceous filler.

7. The microporous web of claim 6, in which the siliceous filler includes precipitated silica.

8. The microporous polymer web of claim 1, in which about 50% to about 60% of the interconnecting pores are between about 0.1 micron and about 5 microns in diameter.

9. The microporous polymer web of claim 1, in which the inorganic wettability component includes silica in an amount such that the microporous polymer web has a silica-to-polyethylene mass ratio of between about 1.2:1 and about 3.0:1.

10. The microporous polymer web of claim 1, in which the polyolefin includes ultrahigh molecular weight polyethylene formed by an extrusion process that includes solvating the ultrahigh molecular weight polyethylene in a plasticizer at elevated temperature, subsequently extracting a quantity of the plasticizer with a solvent, and evaporating the solvent by controlled hot air drying in an absence of steam to create, in the microporous polymer web, the interconnecting pores with a pore size distribution that contributes to reducing the electrical resistivity of the battery separator.

11. The microporous polymer web of claim 1, in which the polyolefin comprises polyethylene.

12. The microporous web of claim 11, in which the polyethylene includes ultrahigh molecular weight polyethylene.

13. The microporous polymer web of claim 12, in which the surface active molecule is thermally stable at ultrahigh molecular weight polyethylene extrusion temperatures.

14. The microporous polymer web of claim 1, in which the surface active molecule is thermally stable between about 160° C. and about 240° C.

15. A method of reducing shrinkage of the dimensions of a microporous polymer web during its process of formation, comprising:
    extruding a mixture including a polyolefin, plasticizer, inorganic wettability component, and surface active molecule containing a hydrophobic tail component to produce a plasticizer-filled polymer sheet, with the polyolefin formed in a three-dimensional matrix;
    using a solvent to extract a quantity of the plasticizer from the polymer sheet to form a microporous polymer web having a thickness and first and second major surfaces, the three-dimensional matrix of polyolefin defining interconnecting pores that provide overall first major surface-to-second major surface fluid permeability, the interconnecting pores having electrolyte-wettable surfaces resulting from dispersion of the inorganic wettability component and anchoring of the surface active molecule to the three-dimensional matrix of polyolefin to provide sustained wettability and low electrical resistivity, the interconnecting pores communicating throughout the thickness of the microporous polymer web; and
    evaporating the solvent by controlled hot air drying in an absence of steam to reduce contraction of the interconnecting pores, and thereby reduce shrinkage of the dimensions, of the microporous polymer web to form a finished polymer web in which the hydrophobic tail component of the surface active molecule is anchored to the polymer matrix.

16. The method of claim 15, in which the evaporating of the solvent by controlled hot air drying in an absence of steam causes a shift in the pore size distribution to a larger average pore size value than that produced with evaporating the solvent by impinging steam on the microporous polymer web.

17. The method of claim 15, in which the polyolefin includes ultrahigh molecular weight polyethylene and the inorganic wettability component includes silica in amounts such that the microporous polymer web has a silica-to-polyethylene mass ratio of between about 1.2:1 and about 3.0:1.

18. The microporous polymer web of claim 15, in which the surface active molecule containing a hydrophobic tail component is selected from a group including block copolymers of polyethylene glycol and polypropylene glycol, block copolymers of polyethylene oxide and polypropylene oxide, alkyl ether carboxylates, sulfates of fatty acid alcohols, linear alkyl benzene sulfonates, and phosphate esters.

19. The method of claim 15, in which the surface active molecule includes a linear alkylbenzene sulfonate with an alkyl moiety of minimum alkyl chain length of C8.

20. The method of claim 19, in which the alkyl moiety has an alkyl chain length from C10 to C16.

* * * * *